United States Patent [19]

Cornwell

[11] 4,390,371

[45] Jun. 28, 1983

[54] METHOD FOR MIXING, SPRAYING AND PLACING CEMENTITIOUS MATERIALS

[76] Inventor: Charles E. Cornwell, 7104 Marlan Dr., Alexandria, Va. 22307

[21] Appl. No.: 289,986

[22] Filed: Aug. 4, 1981

[51] Int. Cl.³ ............................................. C04B 15/00
[52] U.S. Cl. .................................................... 106/88
[58] Field of Search ............................... 106/85, 86, 88

[56] References Cited

U.S. PATENT DOCUMENTS

| | | | |
|---|---|---|---|
| 3,522,069 | 7/1970 | Checko et al. | 106/88 |
| 3,819,388 | 6/1974 | Cornwell | 106/86 |
| 3,879,209 | 4/1975 | Limes et al. | 106/85 |
| 3,912,838 | 10/1975 | Kraus et al. | 106/88 |
| 3,989,534 | 11/1976 | Plunguian et al. | 106/88 |
| 4,077,809 | 3/1978 | Plunguian et al. | 106/88 |
| 4,262,055 | 4/1981 | Russell et al. | 501/111 |

*Primary Examiner*—James Poer

[57] ABSTRACT

This invention consists of an improved method for mixing, spraying and placing cementitious materials and a mechanical arrangement for conveying and combining these materials.

7 Claims, 2 Drawing Figures

METHOD FOR MIXING, SPRAYING AND PLACING CEMENTITIOUS MATERIALS

SUMMARY OF THE INVENTION

This invention relates to an improved method for mixing, spraying and placing cementitious materials having various mix designs that may include aerating the material for controlled densities. The cementitious materials may require steel or other fibers of selected lenghts for reinforcement.

This invention makes use of the so-called static in-line mixers. Many such designs of such fabric mixers are described in patent literature. These mixers are not claimed herein as an invention, but rather as part of the entire system.

There are several aspects of the system which can be used separately or combined into several systems to accomplish several important functions. These functions may be summarized as follows:

1. Starting with a stabilized foaming solution,, such as disclosed in U.S. Pat. No. 3,819,388 by this inventor. A stable fine-celled foam is produced by conveying the diluted foam concentrate with air to the static mixer where the foam is combined with the cementitious materials. As both of these materials pass through the static mixer they are combined into a homogenized mix with controlled densities. This foamed material has several important applications in fireproofing and sound absorbing structures. In particular, it is the only known method of mixing and aerating magnesium oxide with ammonium polyphosphate which is an extremely fast setting cement. This material is very useful in refractories and other high temperature applications. This magnesia cement is described in U.S. Pat. No. 4,262,055.

2. The dry blended mix with various types of cements and aggregates is conveyed by air to the entrance of the static mixer. There it is wet out with the right amount of liquid to form a suitable material for the intended use. The liquid can be potable water, and if required, additives of super water reducers, accelerators or retarders added. This includes ammonium polyphosphate in aqueous solution. There is a broad range of aggregates which include all types of fibers such as glass fibers, steel fibers, ceramic fibers and cellulose fibers. The selected aggregates can be blended with the dry mix and air conveyed through the static mixer, or they can be in the form of a roving or metal ribbon wire where a chopper gun is located at the nozzle to cut desired lengths. These fibers are forced into the cementitious mix and placed almost instantaneously. Superior flexural and impact strengths are obtained when using fibers in cementitious materials.

3. This system is flexible in use, the foam can be shut down and aeration is eliminated or controlled for air entrainment in high density cementitious materials having exceptionally high strength. The fluids added to the dry mix are controlled which provides further control over the ultimate mix that is placed in a fraction of a minute. The chopped fibers are controlled by the operator and can be turned off and on at will. The quick disconnect features of the connectors at the static mixers provides the means for removing one of the static mixers for high density cementitious materials.

This system can be computerized for full automation, or manually operated with only selected units being automated.

This invention offers the following important advantages, compared to the customary methods of mixing cementitious materials:

1. The speed of mixing is very rapid and the static mixers are located close to the nozzle. This is very important when considering the fast setting time of magnesia cements. U.S. Pat. No. 4,039,170 by this inventor shows the static mixers located away from the nozzle which are not considered practical when producing fast setting cementitious compositions. Tests have shown that this improved method eliminates the problems of having the static mixers located down stream from the discharge nozzle.

2. Truck or trailer mounted units can be used for filling pot holes in damaged roads or aircraft runways for quick repairs. The magnesia cements have been placed in pot holes and within 30 minutes the area repaired is open to traffic. The magnesia cement is particularly good in winter time as the composite material generates its own thermal reaction with temperatures reaching 140° F. during the curing cycle time.

3. Labor requirements are reduced.

4. There is less waste of material.

5. It is economical in operation and reduces energy requirements.

6. Cleanliness can be maintained more readily.

7. A more uniform product can be produced.

8. The set product is stronger because of the homogenization of the cement, water (fluids) and aggregates with lower ratios of the fluids.

9. With selected cementitious materials, linings for mine shafts, tunnels and bank stabilization can be completed quickly and obtain over 2000 PSI compressive strengths in 30 minutes.

10. A wide range of density control is possible, from a waterproof high density concrete to low densities with the use of selected aggregates and controlled admixtures of foam all passing through the static mixers. Heated fluids will also speed up the set time and increasing the strength during cold weather operations.

DESCRIPTION OF THE FIGURES

Reference is made to the following figures, wherein.

DETAILED DESCRIPTION OF THE FIGURES

Figure 1:
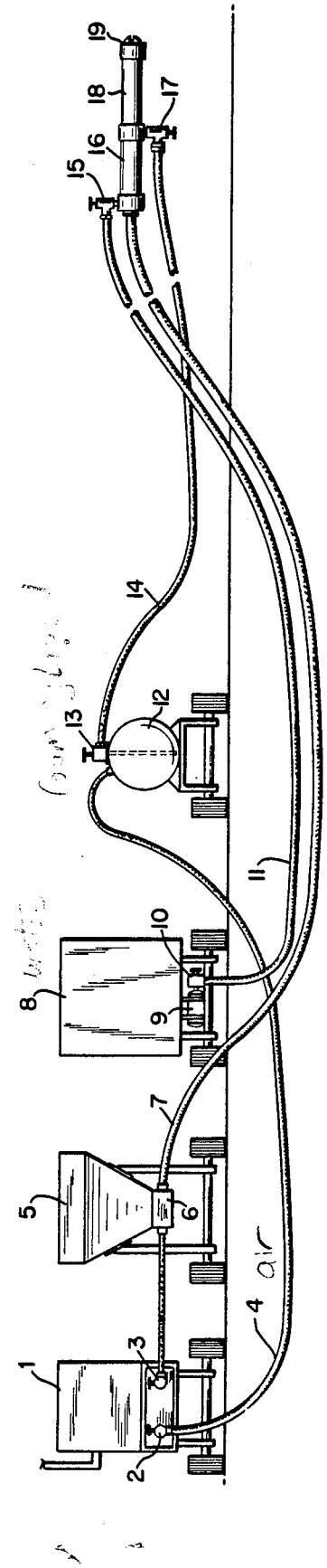
FIG. 1 is a schematic representation for air conveying blended cements and aggregates to the first static mixer where fluid is interjected just before the start of static mixing. The second in-line static mixer interjects the foam just before before passing through the static mixer and out the nozzle for placement.

FIG. 1 shows the improved method for mixing, spraying and placing cementitious materials. Compressed air 1 is conducted through a metering valve 2 and hose 4 to a pressurized tank holding diluted foaming concentrate 12. The air regulator 13 meters the tank pressure 12 and provides additional compressed air to hose 14 where the compressed air serves both for conveying and foaming the liquid while passing through hose 14 to valve 17 just before the static mixer 18. The foam is mixed with the material passing through the first in-line static mixer and exits through nozzle 19. The blended material in hopper 5 is provided compressed air 3 to metering 6 and the blended materials are air conveyed through hose 7. Water tank 8 contains the potable water with additives or fluids such as ammonium polyphosphate in aqueous solution. The fluids can be heated or chilled as required. The pump 9 pressurized the fluid through meter 10 and hose 11 and valve 15 into the fluid ring located just before the static mixer 16 where it is homogenized. The material then passes through the 2nd in-line static mixer where foam is injected 17 and further homogenized in static mixer 18 through nozzle 19. The 2nd in-line mixer 18 can be removed with valve 17 and nozzle 19 placed on the end of static mixer 16 when foaming is not required for lower densities.

Figure 2:
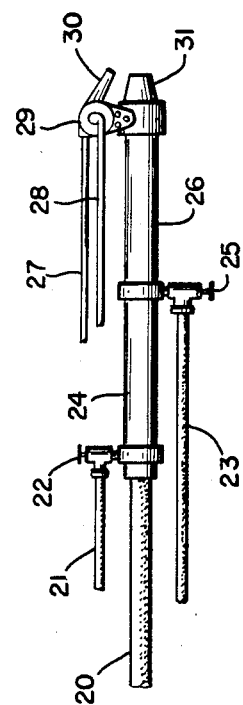
FIG. 2 shows a chopper gun located at the nozzle where various types of fibers can be cut to length and forced into the cementitious material.

FIG. 2 shows a different version of the static mixing system with a chopper gun 29 attached to nozzle 31. The guide 30 is adjustable by degrees up or down so the chopped fibers are forced to enter the homogenized mix. The small hose 23 is a protective device for feeding the roving or steel ribbon to the chopper gun 29.

This system of in-line static mixing can produce on setting low density cementitious products most useful for insulation, fireproofing and sound proofing. The cementitious mix can be reinforced with fibers at the nozzle just before final placement of the homogenized materials. The flexibility of the system provides the means for eliminating the foam and chopped fibers for a dense high strength cementitious material. The fibers can be added to this high strength material when flexural and tensile strengths are required.

What is claimed is:

1. A continuous process for production of cementitious compositions having controlled densities comprising the steps of simultaneously supplying separate flows of fluids and a blend of dry cement and aggregates to a common junction where the flows are intermixed into a common flow upon coming in contact; moving the common flow through static mixers containing a series of angularly disposed baffles causing a turbulence and uniform mixing of the common flow; further comprising adding a flow of preformed foam to the common flow of mixed cementitious compositions and conveying the combined flows to a discharge nozzle; further comprising injecting said fibers into the common flow after exit from the nozzle and just before placement.

2. The process of production of claim 1 wherein the cement is selected from the group consisting of portland cement, calcium aluminate cement, gypsum cement, magnesia cement, and selected flyash cements with ammonium polyphosphate in aqueous solution.

3. The process of production of claim 1 wherein cement additives are introduced into the cementitious composition.

4. The process of production of claim 1 wherein the fluids can be chilled or heated before introduction into the mix.

5. The process of production of claim 1 wherein the static mixers are located in close proximity to each other and near discharge nozzle.

6. The process of production of claim 1 wherein the fiber is selected from the group of glass fibers, steel fibers, ceramic fibers and cellulose fibers.

7. A continuous process for production of cementitious compositions having controlled densities comprising the steps of simultaneously supplying separate flows of fluids and a blend of dry cement and aggregates to a common junction where the flows are intermixed into a common flow upon coming in contact; moving the common flow through a static mixer containing a series of angularly disposed baffles causing a turbulence and uniform mixing of the common flow; further comprising injecting said fibers into the common flow after exit from the nozzle and just before final placement.

* * * * *